United States Patent [19]

Satran

[11] Patent Number: 5,071,292
[45] Date of Patent: Dec. 10, 1991

[54] CUTTING INSERT FOR A MILLING CUTTING TOOL

[75] Inventor: Amir Satran, Kfar Havradim, Israel

[73] Assignee: Iscar Ltd., Tefen, Israel

[21] Appl. No.: 504,928

[22] Filed: Apr. 5, 1990

[30] Foreign Application Priority Data

Apr. 12, 1989 [GB] United Kingdom ................ 8908195

[51] Int. Cl.⁵ .............................................. B23C 5/02
[52] U.S. Cl. .................................... 407/116; 407/113
[58] Field of Search ............... 407/113, 114, 115, 116, 407/34, 35, 53, 54, 42, 63, 64, 65

[56] References Cited

U.S. PATENT DOCUMENTS

| 4,512,689 | 4/1985 | Bylund | 407/113 |
| 4,566,827 | 1/1986 | Neumueller | 407/113 |
| 4,699,549 | 10/1987 | Shimomura | 407/113 |
| 4,834,591 | 5/1989 | Tsujimura | 407/113 |
| 4,840,518 | 6/1989 | Plutschuck | 407/116 |
| 4,940,369 | 7/1990 | Aebi et al. | 407/42 |

Primary Examiner—James G. Smith
Assistant Examiner—B. Shideler
Attorney, Agent, or Firm—Burgess, Ryan & Wayne

[57] ABSTRACT

A cutting insert for use in a peripheral rotary milling cutter having a cylindrical holder and at least one replaceable, peripherally disposed cutting inserts, the cutting insert being formed with at least one cutting edge defined between a cutting rake surface and a relief flank surface of the insert. The cutting rake and relief flank surfaces are continuously curved so that the insert rake and relief angles as defined with respect to the cylindrical holder remain substantially invariant along the length of the cutting edge.

5 Claims, 8 Drawing Sheets

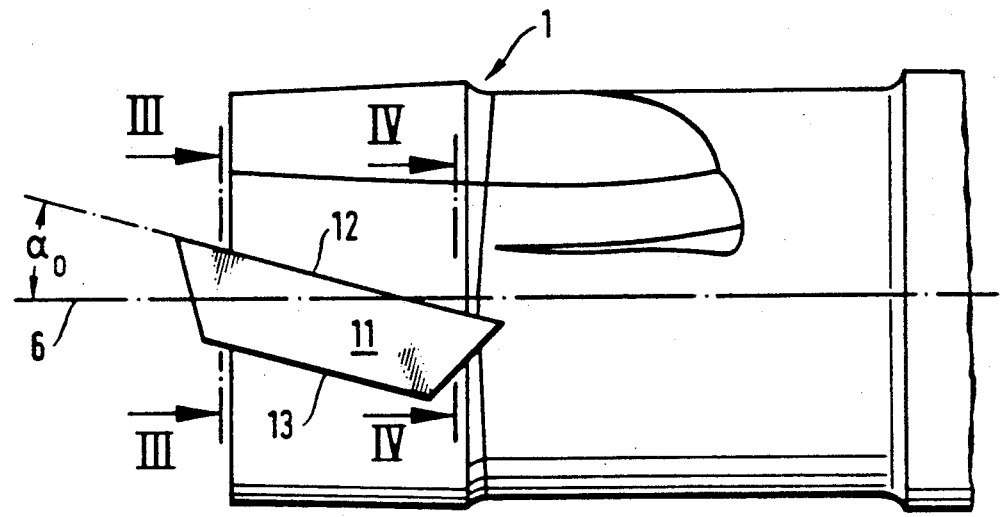
_Fig. 2_
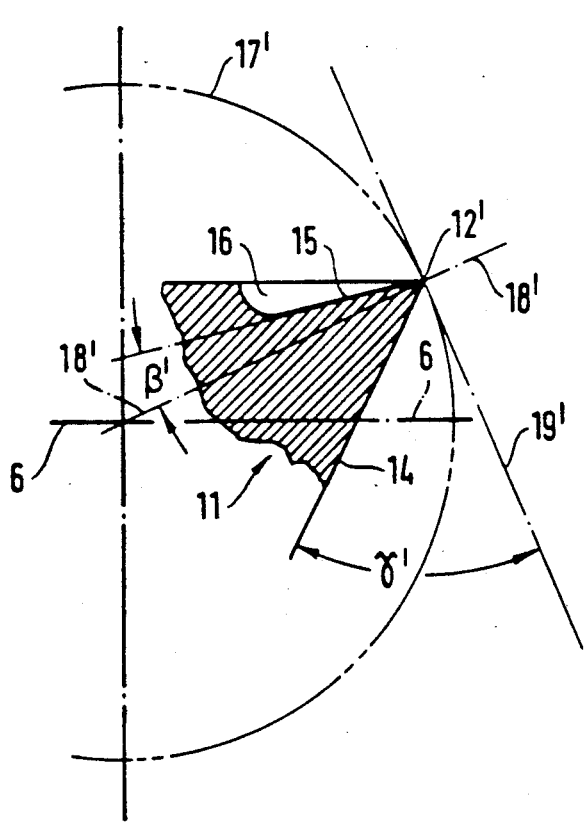
_Fig. 3_
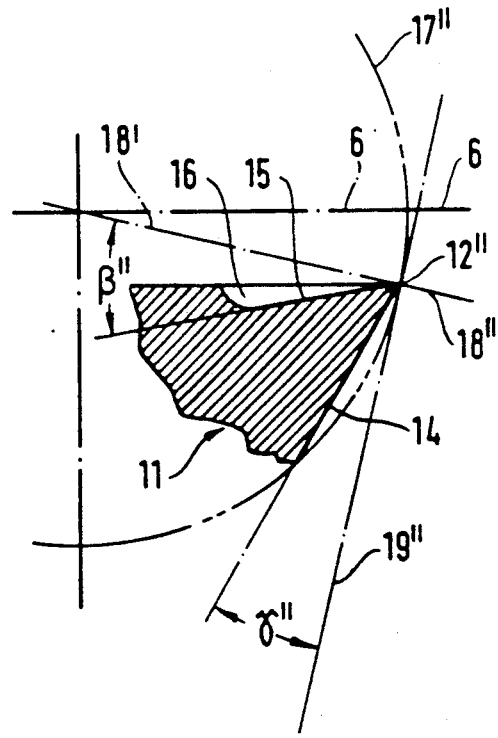
_Fig. 4_

CUTTING INSERT FOR A MILLING CUTTING TOOL

FIELD OF THE INVENTION

This invention relates to a peripheral, rotary, milling cutter comprising a substantially cylindrical holder in which are formed one or more peripheral recesses in which are respectively and releasably mounted a corresponding number of exchangeable hard metal cutting inserts, the or each recess furthermore providing for a swarf space in front of each insert.

BACKGROUND OF THE INVENTION

The cutting insert used in milling cutter tools consists generally of a prismatic body having a planar base from which extend side surfaces—relief flank surfaces—which are intersected by the upper surface—the cutting rake surface. The cutting insert has at least one cutting edge which is defined as an edge created by the intersection of the cutting rake surface and the relief flank.

The insert is so held in the tool that the cutting edge is located in the circular cutting path of the tool and is inclined with reference to the rotary axis by an angle referred to as the axial rake angle.

The magnitude of the axial rake angle has a direct influence on the stability of the tool during operation and also on the durability of the cutting edge. In general, it is advantageous to have the inserts disposed at large axial rake angles. With tools having interchangeable inserts, providing for such large axial rake angles gives rise to a structural weakening of the tool. In consequence, the most common milling cutter tools are constructed for use with relatively low axial rake angles.

It is known that with inserts for milling cutter tools the relief angles employed are relatively large as compared with the angles used with stationary cutting tools, and this is particularly the case with milling tools having low diameter cutting paths. Increasing the relief angle leads to a weakening of the cutting edge and there is in consequence a limitation of the magnitude of the relief angle. The magnitude of the relief angle is determined in accordance with the material of the workpiece, the material from which the cutting edge is formed and the cutting path diameter of the tool. In general, with hard and tough workpiece materials, the relief angle is between 6° to 8° with tools of high speed steel, and between 5° to 7° with carbide tools. On the other hand, with workpieces of mild steels, cast iron, etc., the relief angle can be as high as 20°.

A rake surface of the insert is the surface against which the chips bear as they are being severed. Where the inclination of the rake surface is such as to make the cutting edge keener or more acute, the rake angle is defined as being positive. Where, however, the inclination of the rake surface is such as to make the cutting edge less keen and more blunt, then the rake angle is defined as being negative. It is well known that when the rake angle is increased in the positive direction, the required cutting force and the cutting temperature which is generated, will both tend to decrease. Furthermore, the tool life for such an insert, having a relatively high positive rake angle, tends to increase up to a certain optimum value of the rake angle. On the other hand, the size of the rake angle is limited by the properties of the insert material. Thus, it is not possible to increase the rake angle beyond a certain maximum value.

Thus, it is desirable, in order to achieve optimum cutting performance and tool life, that both the relief angle and the rake angle at all points along the length of the cutting edge be maintained as large as possible.

It has been found, however, that with peripheral rotary milling cutters, as a result of the location of the inserts so as to present an axial rake angle with respect to the longitudinal axis of the cutter, the relief angle presented by the cutting edge at its leading end is very much greater than the relief angle presented by the cutting edge at its opposite trailing end. On the assumption that the relatively smaller relief angle presented by the insert at its trailing end is, in fact, the minimum relief angle which should be employed, it will be realized that the relief angle at the leading end is unduly large, thereby leading to an increased danger of weakening of the cutting edge at this point and a consequent lowering of tool life. On the other hand, whilst the rake angle presented by the insert at its trailing edge is positive to the required degree, the rake angle presented by the insert at its leading end is unduly negative, thereby requiring high cutting forces to be applied to the cutting edge at this leading end, such high cutting forces leading to tool chatter, insert breakage and general shortening of tool life.

With known rotary milling cutters having interchangeable inserts located at an angle to the rotary axis of the tool, the inserts are formed with straight cutting edges. When such tools are used for milling a surface parallel to the rotary axis, the milled surface is not smooth, consisting of concave portions. This of course detracts from the quality of milling and results from the fact that the points of contact of the cutting edge with the workpiece are not all disposed at the same radial distance from the axis.

BRIEF SUMMARY OF THE INVENTION

It is an object of the present invention to provide a new and improved peripheral rotary milling cutter having cutting inserts in which some or all of the above-referred-to disadvantages are substantially reduced or overcome.

According to the present invention, there is provided, for use in a peripheral rotary milling cutter having a cylindrical holder and at least one replaceable, peripherally disposed cutting insert, a cutting insert being formed with at least one cutting edge defined between a cutting rake surface and a relief flank surface of the insert, characterized in that the cutting rake and relief flank surfaces are continuously curved so that the insert rake and relief angles as defined with respect to the cylindrical holder remain substantially invariant along the length of the cutting edge.

By thus ensuring that the insert rake and relief angles remain substantially invariant along the length of the cutting edge with reference to the cylindrical holder and with any choice of axial rake angle, the cutting edge can have all along its length the same optimally effective relief and rake angles, thereby leading to an increase of tool life and a reduction in cutting forces.

Preferably, the cutting insert is formed with at least one cutting edge defined between a cutting rake surface and a relief flank surface of the insert, the or each cutting edge being inclined with respect to the plane of the seating.

Thus, in this way it is possible to achieve an increased axial rake angle without, at the same time, affecting the angle of the insert base with respect to the longitudinal axis of the holder. In other words, the increased axial rake angle is not achieved at the expense of any structural weakening of the holder.

According to a preferred embodiment of the present invention, the cutting insert is formed with at least one cutting edge defined between a cutting rake surface and a relief flank surface of the insert, the cutting edge being curved and forming part of the curved side of a plane which intersects a cylinder constituting a surface of revolution of said cutting edge at an angle corresponding to the axial rake of the cutting edge in the milling cutter.

The provision of such a curved cutting edge ensures the production of a smooth-walled machined surface.

BRIEF SUMMARY OF THE DRAWINGS

For a better understanding of the present invention, and to show how the same may be carried out in practice, reference will now be made to the accompanying drawings in which:

FIG. 2 is a schematic side elevation of a portion of a simplified cutter, illustrating the location of a known cutting insert on and with respect to the cutter holder;

FIG. 3 is a cross-sectional view taken along the line III—III of the insert shown in FIG. 2, superimposed on an associated circular cutting path;

FIG. 4 is a similar cross-sectional view taken along the line IV—IV;

DETAILED DESCRIPTION OF PREFERRED EMBODIMENT

Figure 1:
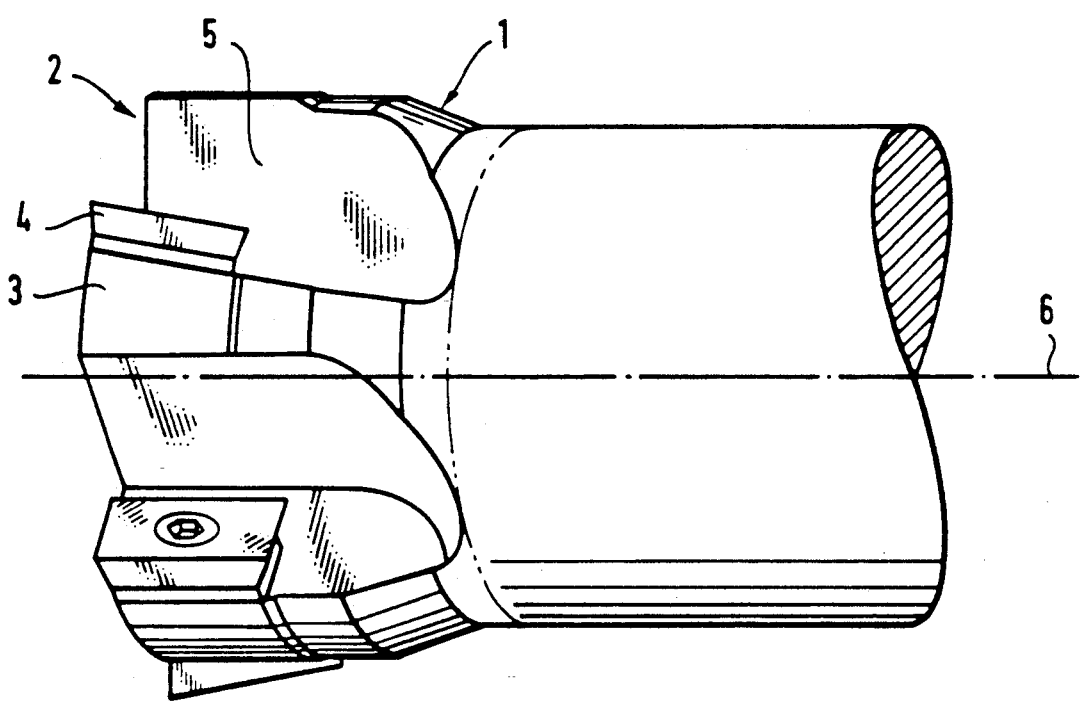
FIG. 1 is a perspective view of one known form of milling cutter to which the invention can be applied.

FIG. 1 shows a rotary milling cutter of the kind to which the present invention refers. As seen, the cutter comprises a cylindrical holder 1 in which are formed substantially equiangularly distributed recesses 2, each recess including an insert support base 3 on which is releasably mounted an exchangeable hard metal cutting insert 4. The remainder of the recess 2 constitutes a swarf space 5. The holder is suitably mounted on a machine tool (not shown) so as to be rotatable about a longitudinal axis 6.

Before proceeding with a detailed description of the preferred embodiment in accordance with the invention, reference will first of all be made to FIGS. 2, 3 and 4 of the drawings, which illustrate some of the relevant geometry of a milling cutter of the kind to which the present invention is applied, using, however, conventional cutting inserts. The schematic side elevation shown in FIG. 2 has been simplified for the purposes of explanation in that there is only shown here the mounting of a single cutting insert.

As seen in FIG. 2, a cutting insert 11 is mounted in an appropriate peripheral recess of the cylindrical holder 1, the cutting insert 11 having an elongated cutting edge 12 parallel to the corresponding edge 13 of the base of the insert 11. The cutting edge 12 defines an angle $\alpha_0$ with respect to the axis 6.

Referring to FIGS. 3 and 4, there are here seen respective cross-sectional views of a portion of the insert 11 taken along the lines III—III and IV—IV (corresponding to leading and rear portions of the insert), shown respectively superimposed on the circular path followed by the respective point on the cutting edge 12 lying on the respective section line. As seen in FIGS. 3 and 4, the insert 11 is formed with a flank surface 14 and with a rake surface 15 which forms part of an elongated chip forming groove 16. The cutting edge 12 is defined at the intersection of the flank 14 and the rake surface 15 and the respective section lines III—III and IV—IV intersect the cutting edge 12 at the points 12' and 12" as shown respectively in FIGS. 3 and 4 of the drawings. With the rotation of the cutting tool, the point 12' along the cutting edge 12 follows a circular path 17' as shown in FIG. 3, whilst the point 12" follows a path 17" as shown in FIG. 4.

As seen in FIG. 3, a radial rake angle $\beta'$ is defined between the rake surface 15 and a radius 18' extending from the center of the circle 17' to the point 12'. Furthermore, a relief angle $\gamma'$ is defined between the flank 14 and a tangent 19' to the circle 17' at the point 12'. Similarly, as seen in FIG. 4 of the drawings, a radial rake angle $\beta''$ is defined between the rake surface 15 and a radius 18" of the circle 17", whilst a relief angle 7" is defined between the flank surface 14 and a tangent 19".

Bearing in mind the considerations referred to above concerning optimal relief angles and radial rake angles, it will be readily seen from FIGS. 3 and 4 of the drawings that whilst the relief angle $\gamma''$ (seen in FIG. 4 and presented in the trailing section of the insert) is probably of an effective optimum minimal value, the corresponding angle $\gamma'$ (shown in FIG. 3 and presented at the leading portion of the insert) is of an excessively large value and this, at a position of the insert subject to the greatest cutting forces. It has already been stated above that such excessively large relief angles can result in a weakening of the cutting edge, resulting in a danger of fracture when a heavy cutting load is applied.

On the other hand, it will be seen that whilst the radial rake angle $\beta'$, shown in FIG. 3 and exhibited at the leading edge of the insert, is significantly negative, the radial rake angle $\beta''$ shown in FIG. 4 and exhibited at the trailing edge of the insert, is suitably positive.

Seeing that negative radial rake angles give rise to increased cutting forces and wear on the insert, the fact that such a negative radial rake angle is to be found at the leading edge of the insert where the greatest cutting load is exerted on the insert, is undesirable. Furthermore, with a known insert of the kind shown in FIG. 2 of the drawings, achieving an increased axial rake angle must of necessity be reflected in the angle of the seat in the cutter holder on which the insert is mounted. It will readily seen that such increasing of the slope must of necessity introduce an element of structural weakness into the cutter holder.

Having thus described the geometry and the inherent disadvantages of known cutting inserts in rotary milling cutters of the kind to which the present invention applies, we shall now proceed to a detailed consideration of the preferred embodiment in accordance with the present invention and, in this connection, reference will now be made to FIGS. 5-17 of the drawings, which illustrate the construction and geometry of a cutting insert in accordance with the present invention for use with a rotary milling cutter 20 comprising a cylindrical holder 20a.

Figure 5:
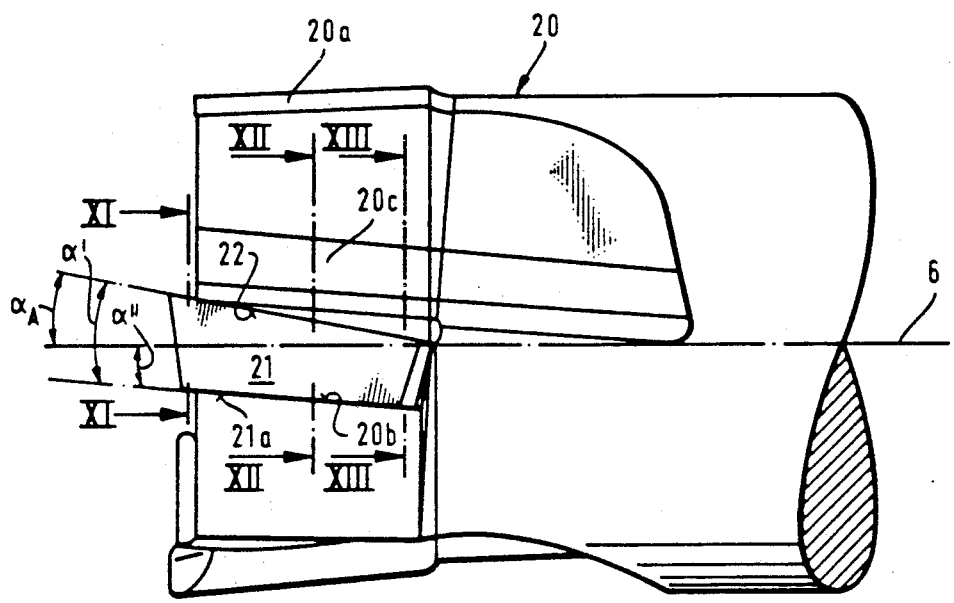
FIG. 5 is a schematic side elevation of a simplified cutter, showing the mounting thereon of a cutting insert in accordance with the invention.

As seen in FIG. 5 of the drawings, an insert 21 is mounted on seating 20b formed in a recess 20c located within the holder 20a. The insert 21 is formed with an elongated cutting edge 22 which, unlike the prior art inserts, is not parallel to the corresponding edge of the insert base but is directed at an acute angle $\alpha'$ with respect to the corresponding edge 21a of the insert base. On the other hand, the insert base is directed at an angle $\alpha'$ with respect to the longitudinal axis 6 of the rotary cutter. This angle $\alpha'$ corresponds to the axial rake angle of a conventional prior art insert having cutting edge and base edge parallel to each other. The axial rake angle $\alpha_A$ of the cutting edge 22 is therefore equal to $\alpha' + \alpha''$. As can seen, $\alpha'$ is not zero in magnitude and is substantially invariant along the length of the cutting edge 22 and as a consequence, the axial rake angle $\alpha_A$, is also substantially invariant.

It will thus be seen that, by virtue of the present invention, the cutting edge 22 is provided with an increased axial rake angle without in any way requiring the provision of an insert seating which is directed at an angle with respect to the rotary axis 6 of the cutter greater than the angle $\alpha'$ which is the normal seating angle using prior art inserts. Thus, it is possible to achieve an increased axial rake angle without introducing an additional element of structural weakness into the rotary cutter holder.

Reference will now be made to FIGS. 6 through 9 of the drawings, which illustrate a particular cutting insert. As seen in the figures, the insert 21, which is of parallelipedal shape, is formed with a pair of elongated side cutting edges 22a and 22b and front and rear cutting edges 23a and 23b. The cutting edge 22a is defined between a side flank 24 and a downwardly sloping rake surface 25a, the cutting edge 22a being separated from the rake surface 25a by a narrow land surface 26a. Similarly, the cutting edge 22b is defined between a similar side flank surface (not seen) and a downwardly sloping rake surface 25b, a narrow, elongated land surface 26b being interposed between the cutting edge 22b and the rake surface 25b. The front cutting edge 23a is defined between a front flank surface 27 and a downwardly sloping rake surface 28a, from which it is separated by a front land surface 29a. Similarly, the rear cutting edge 23b is defined between a rear flank surface (not seen) and a rear rake surface 28b from which it is separated by a rear land surface 29b.

Figure 6:
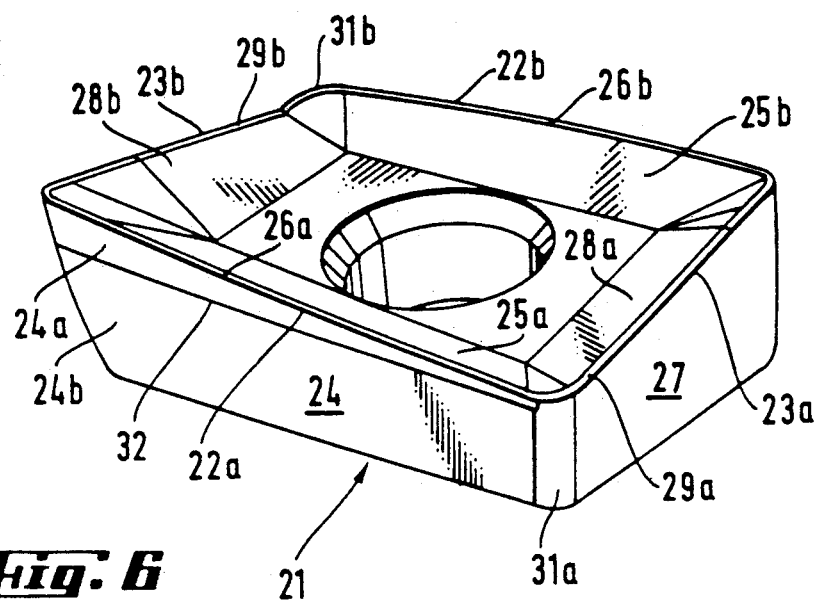
FIG. 6 is a perspective view of a cutting insert in accordance with the invention.
Figure 7:
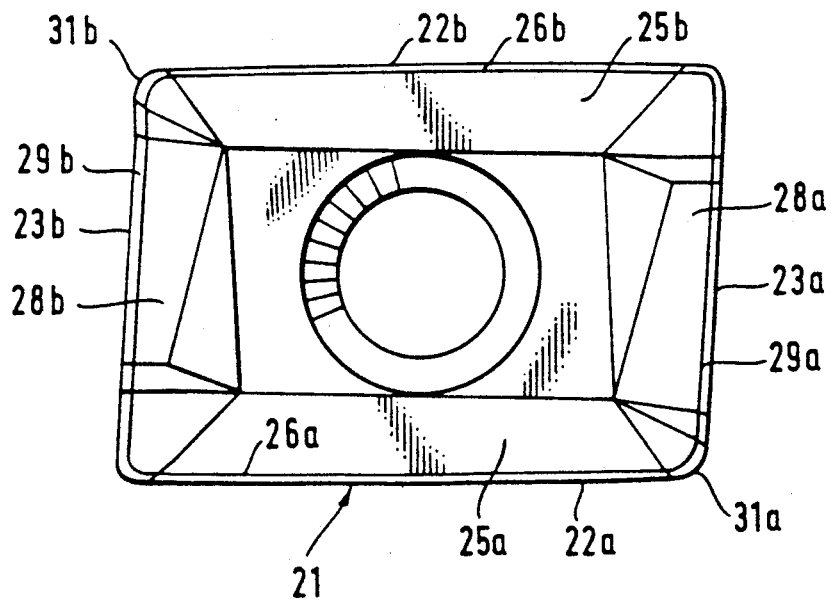
FIG. 7 is a plan view from above of the cutting insert shown in FIG. 6.
Figure 8:
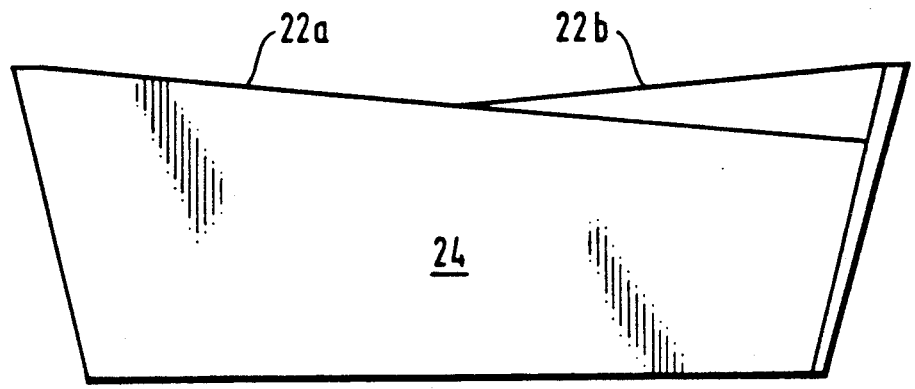
FIGS. 8 and 9 are respective side and front elevations of the cutting insert shown in FIG. 6.

In common with the insert described with reference to FIG. 5 of the drawings, the insert 21 shown in FIG. 6 and FIG. 8 is formed with side cutting edges 22a and 22b which slope in opposite senses so as to define acute angles with the corresponding edges of the base of the insert 21, thereby imparting increased but oppositely directed axial rake angles to the opposite sides of the insert. Thus, the height of the insert at the diametrically opposed corners thereof associated with the wipers 30a and 30b is greater than the height of the inserts at the other pair of diametrically opposed corners 31a and 31b. It therefore follows that the front and rear cutting edges 23a and 23b slope in opposite directions, defining acute angles with the corresponding front and rear edges of the base of the insert 21.

The side flank 24 of the insert 21 is divided at the line 32 into a narrow, upper side flank portion 24a and a lower, wider side flank portion 24b. The opposite side flank of the insert 21 (not seen) is similarly divided. In accordance with the present invention, the side flank portion 24a and the rate surface 25a are continuously curved in such a manner that the relief angle as measured at any point on the cutting edge 22a with reference to the tangent at that point to the appropriate circular cutting envelope, remains invariant along the length of the cutting edge, as does the radial rake angle with respect to any point along the cutting edge 22a. It follows, therefore, that the angle defined between the rake surface 25a and the flank portion 24a remains constant along the length of the cutting edge. Whilst the upper, narrow flank surface portion 24a is continuously curved as described above, the lower, wider flank portion 24b remains substantially planar, thereby facilitating the ready mounting and clamping of the cutting insert on the cutting holder. The shape and configuration of the side flank 24 and the rake surface 25a just described is mirrored by the shape and configuration of the rake surface 25b and the associated flank surface (not seen).

The construction and curvature of the respective surfaces of the insert just described with reference to FIGS. 6 through 9 of the drawings is pictorially illustrated in FIG. 10, which is a schematic, simplified perspective view of the milling cutter where, for the sake of simplification, the cutter is shown with only one cutting insert. It should be emphasized that the curvatures seen in this figure are considerably exaggerated for the purposes of explanation.

Figures 11, 12, 13:
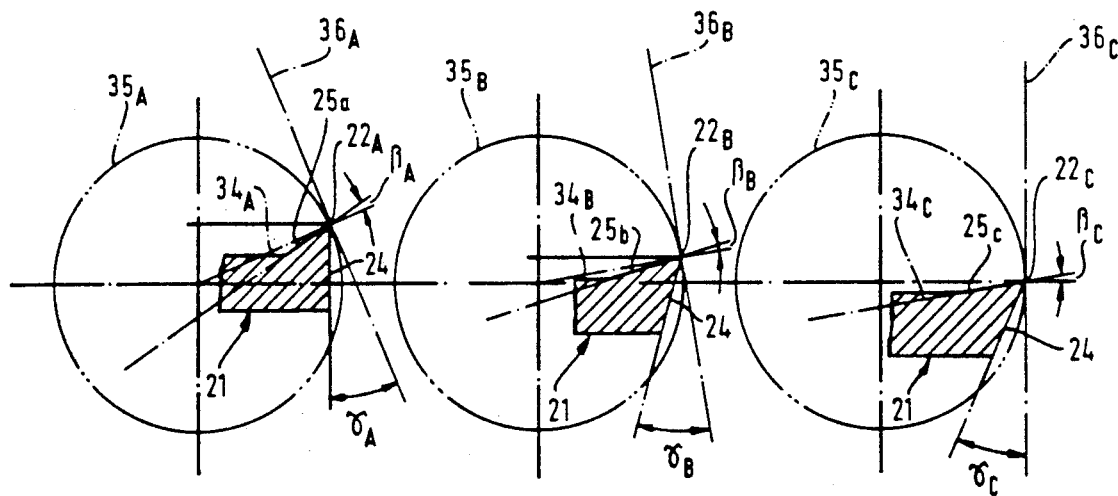
FIGS. 11, 12 and 13 are respective cross-sectional views of the milling cutter and cutting insert shown in FIG. 5, taken along the lines XI—XI, XII—XII and XIII—XIII and shown superimposed on the associated circular cutting path.

Reference will now be made to FIGS. 11, 12 and 13 of the drawings, which are respective cross-sectional views of a portion of the insert 21 taken along the lines XI—XI, XII—XII and XIII—XIII of FIG. 5, shown respectively superimposed on the circular paths followed by the respective points on the cutting edge 22 lying on the respective section lines.

As seen in FIG. 11, a radial rake angle $\beta_A$ is defined between the rake surface 22 and a radius 34a extending from the center of the circular path 35a to the point 22a on the cutting edge. Furthermore, a relief angle $\gamma_A$ is defined between the flank 24 and a tangent 36a to the circular path 35a at the point 22a. Similarly, as seen in FIG. 12 of the drawings, which refer to an intermediate point 22b along the cutting edge 22, a radial rake angle $\beta_B$ is defined between the rake surface 25b and a radius 34b of the circular path 35b, whilst a relief angle $\gamma_B$ is defined between the flank surface 24 and a tangent 36b.

Finally, at the point 22c at the trailing edge of the cutting edge 22, a radial rake angle $\beta_C$ is defined between the rake surface 25c and a radius 34c of the circular path 35c, whilst a relief angle $\gamma_C$ is defined between the flank surface 24 and a tangent 36c.

By virtue of the appropriate continuous curvatures of the flank surface 24 and the rake surface 25, it is ensured, as shown in FIGS. 11, 12 and 13 of the drawings, that the relief angles $\gamma_A$, $\gamma_B$ and $\gamma_C$ are substantially equal, remaining substantially invariant along the length of the cutting edge 22. Similarly, it is ensured that the radial rake angles $\beta_A$, $\beta_B$ and $\beta_C$ are substantially equal, remaining substantially invariant along the length of the cutting edge 22. Thus, at all points along the length of the cutting edge, the relief angle corresponds to the optimally effective, minimum relief angle, thus ensuring effective tool life without substantially weakening the cutting edge. Similarly, the radial rake angle $\beta$ remains positive along the major portion of the length of the cutting edge positive, and even at the trailing edge the degree of negativeness thereof is only minimal. An optimal radial rake angle $\beta$ is therefore maintained.

Figure 14:
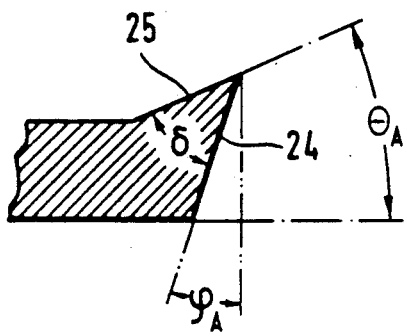
FIGS. 14 and 15 are respectively cross-sectioned views of the cutting insert shown in FIG. 6, taken along the lines XIV—XIV and XV—XV.
Figure 15:
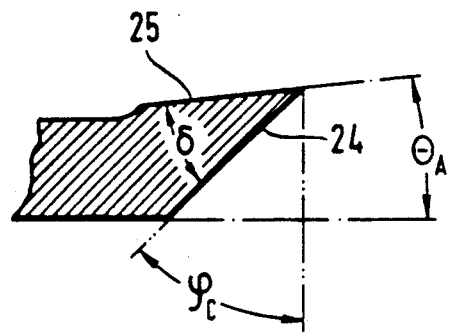
Figure 17:
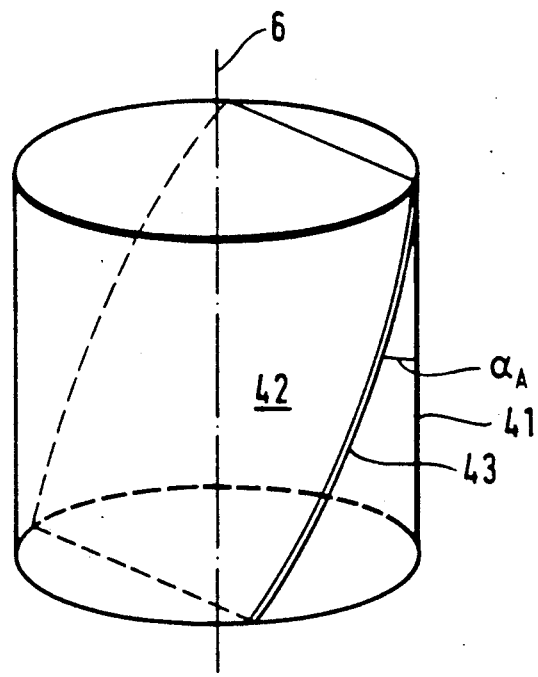
FIG. 17 is a schematic illustration of one form of determination of the curvature of the cutting edge of an insert as shown in FIGS. 6, 7, 8 and 9.

As seen in FIGS. 14 and 15 of the drawings, which illustrate cross-sectional views of the insert per se respectively at the leading and trailing edges thereof, the curvatures of the flank 24 and rake surfaces 25 ensures at all stages the maintenance of a substantially constant angle $\delta$ between the rake surface 25 and the flank surface 24. On the other hand, the angle $\psi$ subtended between the flank 24 and a line normal to the base of the insert, increases from a minimal value $\psi_A$ at the leading edge of the insert to a maximum value $\psi_C$ at the trailing edge of the insert. At the same time, the angle defined between the rake surface 25 and the plane of the base of the insert varies from a maximum $\theta_A$ at the leading edge of the insert to a minimum $\theta_C$ at the trailing edge of the insert.

Figure 9:
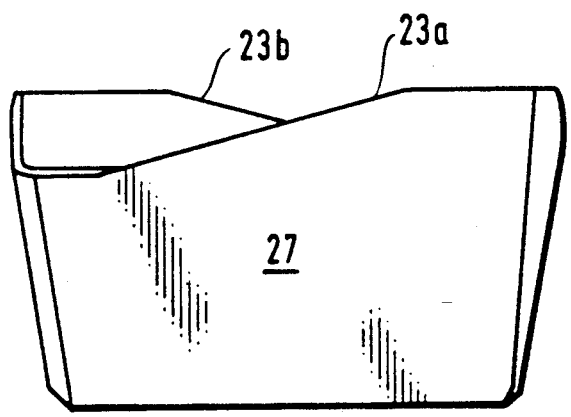
Figure 10:
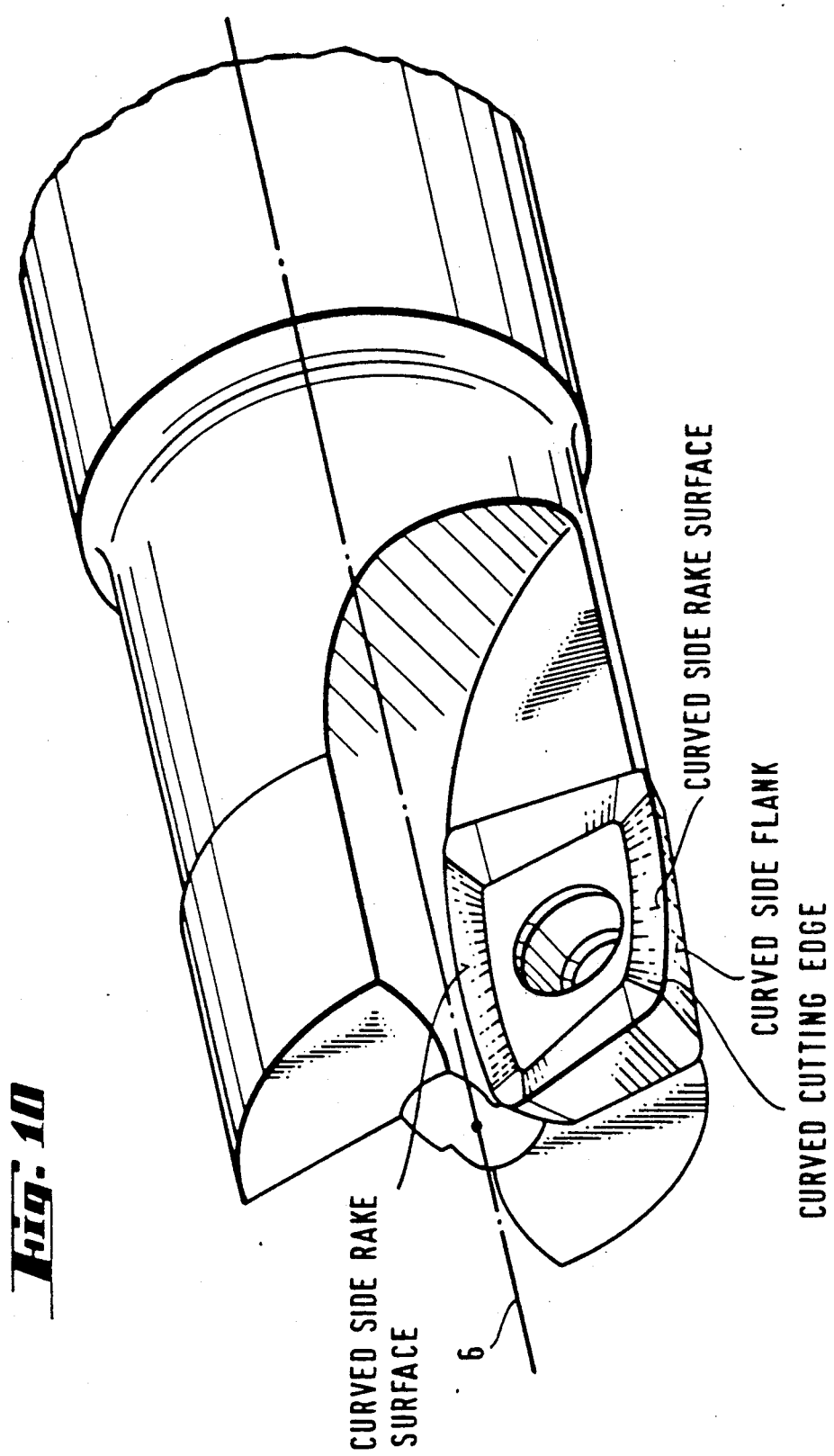
FIG. 10 is a schematic perspective view of a part of a simplified milling cutter of the kind shown in FIG. 1 showing, on an enlarged scale and in an exaggerated form, the cutting insert in accordance with the invention as shown in FIGS. 6, 7, 8 and 9.
Figure 16:
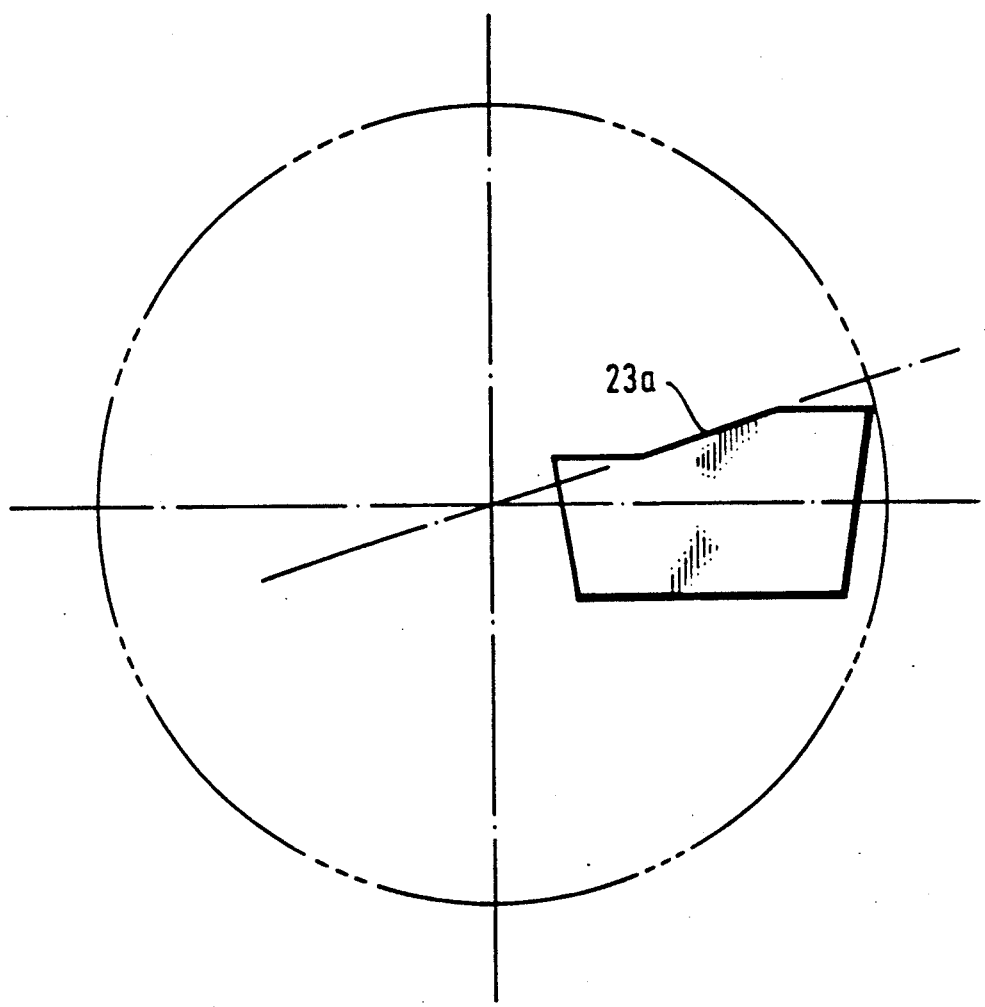
FIG. 16 is a front plan view of a milling cutter showing an end face of a cutting insert in accordance with the invention superimposed on a circular cutting path.

Reference will now be made to FIGS. 9 and 16 of the drawings for a description of the geometry and functioning of the front and rear faces of the insert. From these figures, it will be seen that the front cutting edge 23a and the rear cutting edge 23b slope downwardly towards the base of the insert in respectively opposite directions. From FIG. 16 it can be seen that the slope of the front cutting edge 23a is such that it coincides with a radius of the circular cutting path. In this way, it is ensured that the radial rake angle at any point along the cutting edge 23a does not become positive (as is the case with prior art inserts) and consequently the cutting forces generated, e.g. during end face milling, are kept down.

The cutting edge 22 of the insert 21 is curved in order to ensure a substantially smooth machined surface produced by the milling cutter. The particular curvature of the cutting edge 22 is determined as follows and with reference to FIG. 17 of the drawings. In this figure, a cylindrical surface 41 is defined as the envelope generated as a result of the rotation of the cutting edge 22 about the axis of rotation 6. If now a sectional plane 42 is formed within the cylindrical surface 41 and located at an angle with respect to the axis of rotation 6 corresponding to the axial rake angle $\alpha_A$, then the edge 43 of this plane 42 is of a curvature corresponding to the desired curvature of the cutting edge 22. As indicated above, when the cutting edge 22 is formed with such a curvature, then the machined surface produced thereby is substantially smooth. It can be shown that the curvature of the cutting edge 22 can be represented by the following relationship:

$$r = \frac{\left(\frac{l}{4}\right)^2 + \left(\frac{D}{2} - \frac{\sqrt{\frac{D^2}{4} - \frac{l^2}{4}\sin^2\alpha_A}}{2}\right)^2}{\frac{D}{2} - \frac{\sqrt{\frac{D^2}{4} - \frac{l^2}{4}\sin^2\alpha_A}}{2}}$$

where
r = radius of curvature of cutting edge;
l = length of a chord joining the ends of the curved cutting edge;
D = Diameter of cylindrical envelope of the cutting edge;
$\alpha_A$ = Axial rake angle Whilst the present invention has been specifically described with respect to a preferred embodiment having two main side cutting edges, the invention is equally applicable to inserts having a single cutting edge as well as to inserts of triangular shape having three cutting edges. Furthermore, the invention is equally applicable to inserts having left-hand curvatures as well as to inserts having right-hand curvatures.

Cutting inserts in accordance with the invention can be readily employed with rotary milling cutters having one or more such inserts as well as with milling cutters wherein the inserts are arranged in a helical sequence.

I claim:

1. A cutting insert for use in a peripheral rotary milling cutter having a holder and at least one replaceable, peripherally disposed cutting insert, said cutting insert being formed with at least one cutting edge defined between a cutting rake surface and a relief flank surface of the insert and having a corresponding base edge defined between a base surface and said relief flank surface, wherein the cutting edge is inclined with respect to the corresponding base edge at an angle which is not zero and is substantially invariant along the length of the cutting edge, and wherein the cutting rake and relief flank surfaces are continuously curved so that the insert rake and relief angles as defined with respect to the holder remain substantially invariant along the length of the cutting edge.

2. A cutting insert according to claim 1, wherein said relief flank surface comprises a continuously curved upper portion and a substantially planar lower portion.

3. A cutting insert according to claim 2, wherein said cutting edge is curved and forms part of the curved side of a plane which intersects a cylinder constituting a surface of revolution of said cutting edge at an angle corresponding to the axial rake angle of the insert in the milling cutter.

4. A cutting insert according to claim 1 of substantially parallelipedal shape, wherein it is provided with a pair of said cutting edges constituting side cutting edges at opposite sides of said insert and defined between respective relief flank surfaces and said cutting rake surface and front and rear cutting edges radially directed with respect to respective circular cutting paths of said front and rear cutting edges.

5. A cutting insert according to claim 1, wherein said holder is a cylindrical holder and wherein said cutting edge is curved and forms part of the curved side of a plane which intersects a cylinder substituting a surface of revolution of said cutting edge at an angle corresponding to the axial rake angle of the insert in the milling cutter.

* * * * *